July 21, 1925.
J. H. NAYLOR
AVERAGING DEVICE
Filed March 3, 1925
1,547,062
2 Sheets-Sheet 1
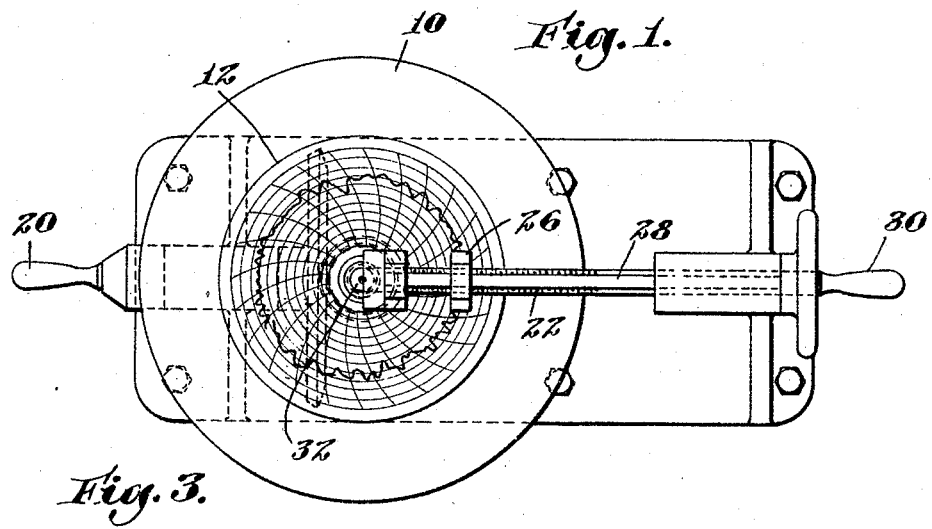
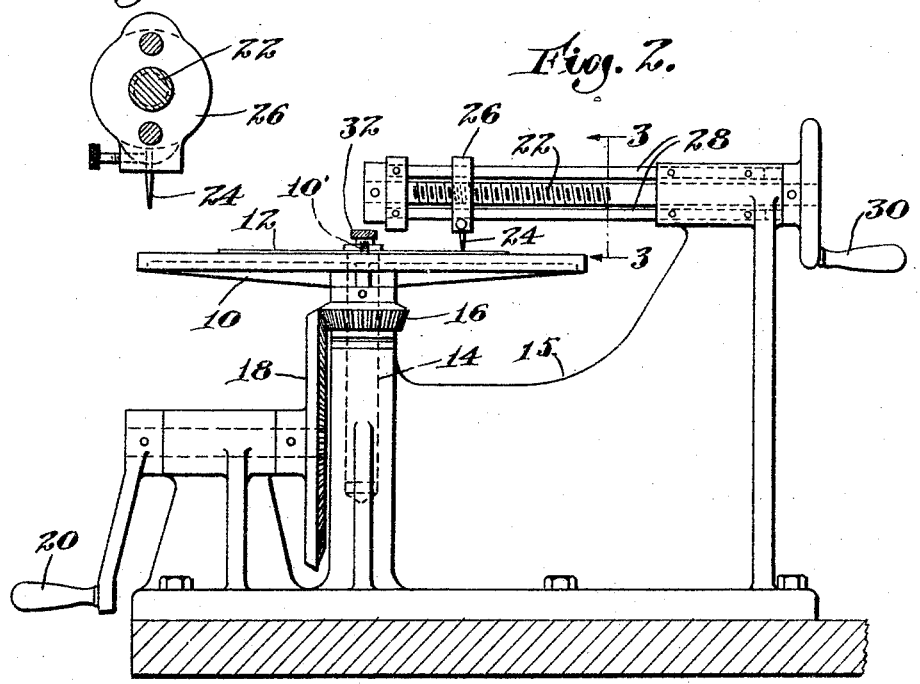
Inventor
John H. Naylor
by Mitchell, Chadwick & Kent
Attorneys Inventor
John H. Naylor
by Mitchell Chadwick Kent
Attorneys Patented July 21, 1925.

1,547,062

UNITED STATES PATENT OFFICE.

JOHN H. NAYLOR, OF FOXBORO, MASSACHUSETTS.

AVERAGING DEVICE.

Application filed March 3, 1925. Serial No. 12,979.

*To all whom it may concern:*

Be it known that I, JOHN H. NAYLOR, a citizen of the United States, residing at Foxboro, in the county of Norfolk and State of Massachusetts, have invented certain new and useful Improvements in Averaging Devices, of which the following is a specification.

This invention relates to improvements in averaging devices. More especially it relates to a device for averaging the record made on a disk or cylindrical chart by automatic recording apparatus responsive to changes of conditions, for example, pressure, temperature, per cent of $CO_2$ present in flue gas, or the like. These records are usually in the form of wavy lines, or scattered points, or both, and show the variations of conditions during a certain period, as a day or a week. It is often the practice to determine the average condition of the period, and this has had to be done either by laborious measuring, tabulating and computing with a pencil by hand or by rather complicated and expensive calculating machines which must be skilfully manipulated, requiring that a pointer be passed over all the various recorded points, in order that all may enter into the calculation and integration of the machine, and this must be done with great care in order to prevent inaccurate result.

It is among the objects of the present invention to provide means for approximating the average reading of such a record quickly, and with sufficient accuracy for practical purposes. It is a feature of the invention that its principle can be applied to the averaging of both disk and cylinder records of any diameter, and having any kind of line or point markings.

A further feature is the instant adaptability of the device to different kinds of records. That is, a record of pressure changes may be followed by a record of moisture present, or temperature changes or other kind of record, and each may be averaged within a few seconds after the record is set in the device.

Apparatus by which the invention may be practiced comprises a rotatable support whereon the disk or cylindrical record can be fixed, so as to rotate on its own axis, and a pointer which can be moved transversely of the record line. Upon whirling the recorded line or points in the direction in which the paper or pen moved in making the record, or the reverse, an optical effect arises, due to the lingering of images on the retina of the human eye, in which each whirling point tends to appear as a line. If two points are of equal radius they make a line twice as black as would a single point of the same radius. In a recorded line whose points have varying radius as the line fluctuates to each side of its average value, the number of crossings of the imaginary line constituting the average will be greater than the number of crossings of any imaginary line which is not the average. Thus the average line will appear visually as of greater density than any other part of the darkened zone which results from the whirling of the record. The setting of the pencil point of the apparatus over this line of greatest apparent density therefore indicates approximately the average line,—and by touching the pencil point to the record sheet the average line is inscribed thereon. It may then be measured on the record sheet, at any time in future, or may be measured in the apparatus, without marking the sheet, by noting the setting of the pointer, e. g., in the case of a disk record, by noting the radius at which the pointer is set when in position to indicate the line of greatest apparent density.

It is intended that the patent shall cover, by suitable expression in the appended claims, whatever features of patentable novelty exist in the invention disclosed.

In the accompanying drawings,

Figure 1 is a plan of apparatus by which the present invention may be practiced, showing a disk record in position to be averaged;

Figure 2 is an elevation of the same;

Figure 3 is a section on line 3—3 of Figure 2;

Figure 4:
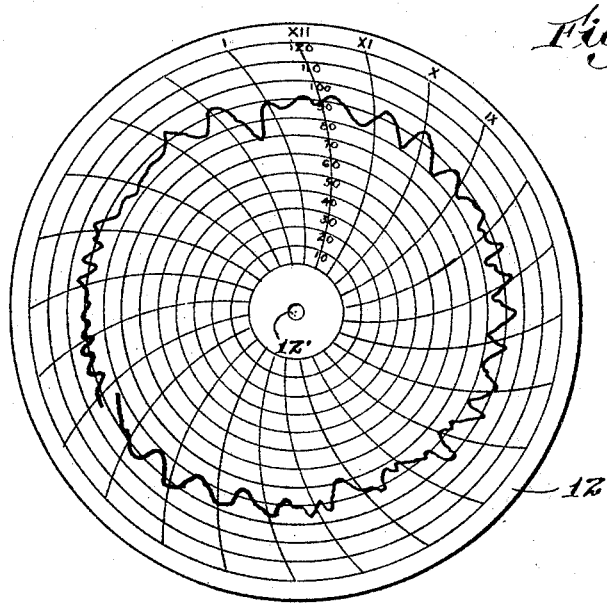
Figure 4 is a plan of a record as it appears when stationary.
Figure 5:
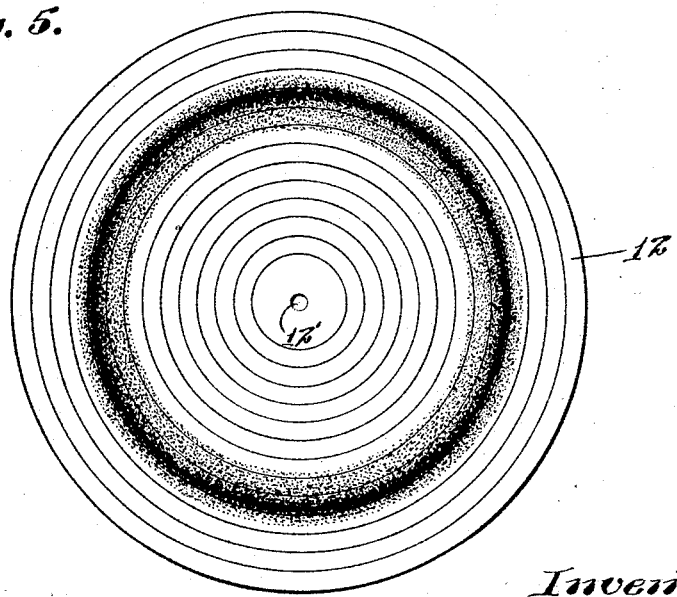
Figure 5 is a plan of the same record as it appears when being whirled.

Referring to the drawings, which show the application of the invention for disk records, although by suitable modification it can be applied to cylindrical or other whirlable forms, the device comprises a table 10 upon which can be placed concentrically therewith a disk 12 whose record is to be averaged. The table is fixed on a vertical shaft 14 which is suitably mounted in the base 15, and carries a bevel pinion 16 adapted to mesh with and be driven by a larger gear 18 when the latter is turned by the hand crank 20. Extending radially over the table, is a worm shaft 22 carrying a pointer 24, whose nut-holder 26 engages the threads on shaft 22, and slides on two fixed shafts 28 extending parallel to the threaded one. The fixed shafts prevent rotation of the nut-holder, so that upon the rotation of the worm by the handwheel 30 the pointer will be moved toward or from the center of the disk. The pointer may have a pencil or pen if desired.

The operation of the device is extremely simple. The disk is placed on the table, with a threaded axial pin 10' of the latter projecting through the central hole 12' of the disk, and clamped by thumb nut 32. The crank 20 is then turned by one hand of the operator while the other grasps the wheel 30. When the speed of the disk is sufficient the lines or points of the record lose their identity, and disappear as such, but then blend or dissolve into or form a more or less distinct circular zone in which all marks in the record at each particular radial distance or circle from the axis are mixed together in the retina of the eye of the observer, with the spaces or unmarked points between such record points, all in the same circle. This makes a zone having differing density of color, the greatest density being in the circle which has most points of the recorded line. Therefore the pointer is to be moved by the rotation of wheel 30, until it comes over said circle of greatest density. Upon the disk being stopped, the reading at which the pointer points is approximately the average of the record readings for the period covered by the chart. If there are two distinct lines of about the same density, which might represent extended periods at certain maximum and minimum points the pointer would be set midway between the two said equal lines or more toward one if it were considered heavier. Where there is no marked line of great density but a path of substantially even weight, the pointer would be set at the middle of its extent. Any large divergence from the normal path, such as might result if the pressure should suddenly fall to zero, as upon a pipe breaking, need not be considered, and only the path developed by the record in its normal variations averaged.

The cylinder record averaging device is the same in principle as the one just described, the chart being attached to a rotatable cylindrical table and the pointer being movable parallel to its axis and transversely of the record.

And for either style of record some other arrangement for holding and whirling the record sheet could be substituted for that shown and as well other means could be used for holding and setting the pointer.

It is obvious that it matters not how frequent or irregular are the fluctuations in the record to be averaged. The chart having been rapidly rotated the circular line having in it the greatest number of recorded points automatically appears more prominent than all other circular lines made by the rotation.

I claim as my invention:

1. The method of averaging a circularly formed fluctuating record comprising the whirling of the record on its axis of generation at a sufficient speed for the points of the record to lose their identity visually, and severally to blend with the other points and spaces in their several circles, whereby the number of record points in any one circle becomes represented by the density of the shading of said circle.

2. The method of averaging a circularly formed fluctuating record comprising the whirling of the record on its axis of generation at a sufficient speed for the points of the record to lose their identity visually, and severally to blend with the other points and spaces in their several circles, whereby the number of record points in any one circle becomes represented by the density of the shading of said circle; and the indicating, on the record sheet, of the approximate average of the record according to the location and relative density of the circular lines thus generated.

3. A device for averaging a circularly formed fluctuating record comprising a rotatable support for the record sheet whereby it may be whirled to mix the record in the retina of the observer.

4. A device for averaging a circularly formed fluctuating record comprising a rotatable support for the record sheet whereby it may be whirled to mix the record in the retina of the observer; and means for setting an indicator at that circle of said observed mixture which corresponds approximately to the average as thus portrayed.

5. A device for averaging a circularly formed fluctuating record comprising a rotatable table, adapted to hold the record sheet; means for whirling to mix the record circularly but not radially; and a pointer movable transversely across said mixed record adapted to be set at the line thereof corresponding to the approximate apparent average of the record as thus portrayed.

Signed at Foxboro, Massachusetts, this 31st day of January, 1925.

JOHN H. NAYLOR.